(12) United States Patent
Johnson et al.

(10) Patent No.: US 7,780,119 B2
(45) Date of Patent: Aug. 24, 2010

(54) MODULAR SPACECRAFT

(76) Inventors: Michael David Johnson, 513 High Ridge Dr., Friendswood, TX (US) 77546; Baron Hall, 16623 Tibet Rd., Friendswood, TX (US) 77546

( * ) Notice: Subject to any disclaimer, the term of this patent is extended or adjusted under 35 U.S.C. 154(b) by 237 days.

(21) Appl. No.: 11/950,269

(22) Filed: Dec. 4, 2007

(65) Prior Publication Data

US 2009/0127398 A1 May 21, 2009

Related U.S. Application Data

(60) Provisional application No. 60/874,107, filed on Dec. 11, 2006.

(51) Int. Cl.
 *B64G 1/12* (2006.01)
 *B64G 1/64* (2006.01)
(52) U.S. Cl. .................. 244/173.1; 244/159.6
(58) Field of Classification Search ............. 244/158.1, 244/159.4, 159.6, 172.4, 173.1
See application file for complete search history.

(56) References Cited

U.S. PATENT DOCUMENTS

| | | | |
|---|---|---|---|
| 4,872,625 A * | 10/1989 | Filley | 244/159.4 |
| 5,094,409 A * | 3/1992 | King et al. | 244/159.6 |
| 5,626,310 A | 5/1997 | Kelly | |
| 5,791,600 A * | 8/1998 | Thompson | 244/159.4 |
| 5,927,653 A | 7/1999 | Mueller et al. | |
| 6,036,144 A | 3/2000 | Sisk | |
| 6,113,032 A | 9/2000 | Cochran et al. | |
| 6,206,327 B1 * | 3/2001 | Benedetti et al. | 244/159.4 |
| 6,513,760 B1 | 2/2003 | Mueller et al. | |

OTHER PUBLICATIONS

Ray, J. Delta 4 fleet goes from 'Medium' to Heavy. Space Flight Now [online], Nov. 12, 2002 [retrieved on Sep. 22, 2008]. Retrieved from the Internet<URL:http://spaceflightnow.com/delta/d315/050609delta4.html>.

* cited by examiner

*Primary Examiner*—Rob Swiatek
(74) *Attorney, Agent, or Firm*—Hulsey, P.C.; William N. Hulsey, III

(57) ABSTRACT

A modular spacecraft incorporating a launch vehicle interface design that also functions as a berthing or docking interface for the spacecraft. The vehicle interface utilizes existing launch vehicle components to minimize cost and time to flight. In addition, the spacecraft is constructed from off-the-shelf launch vehicle components that enable a low cost construction as well as a secondary payload carrying functionality.

21 Claims, 7 Drawing Sheets

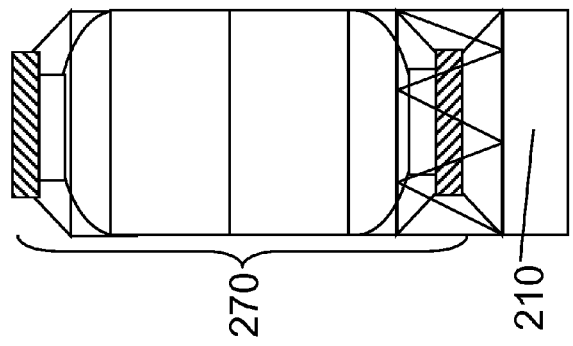
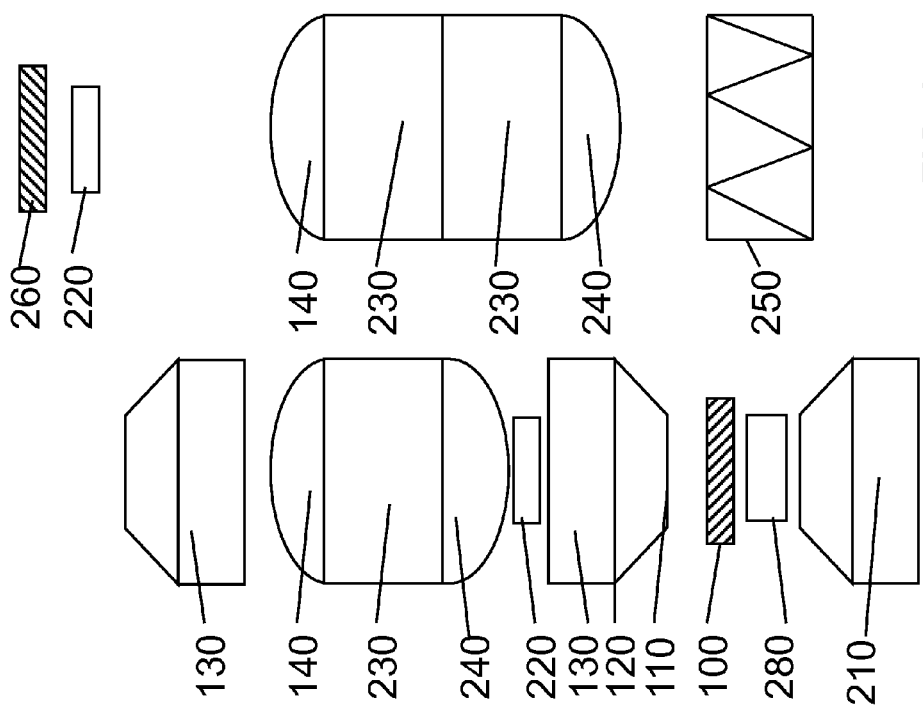
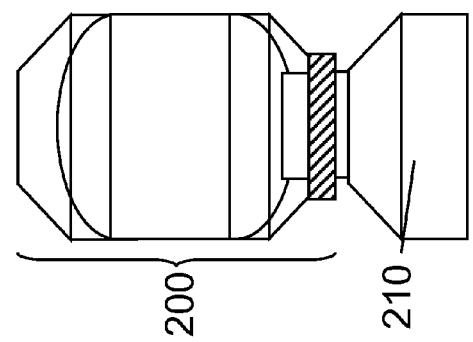

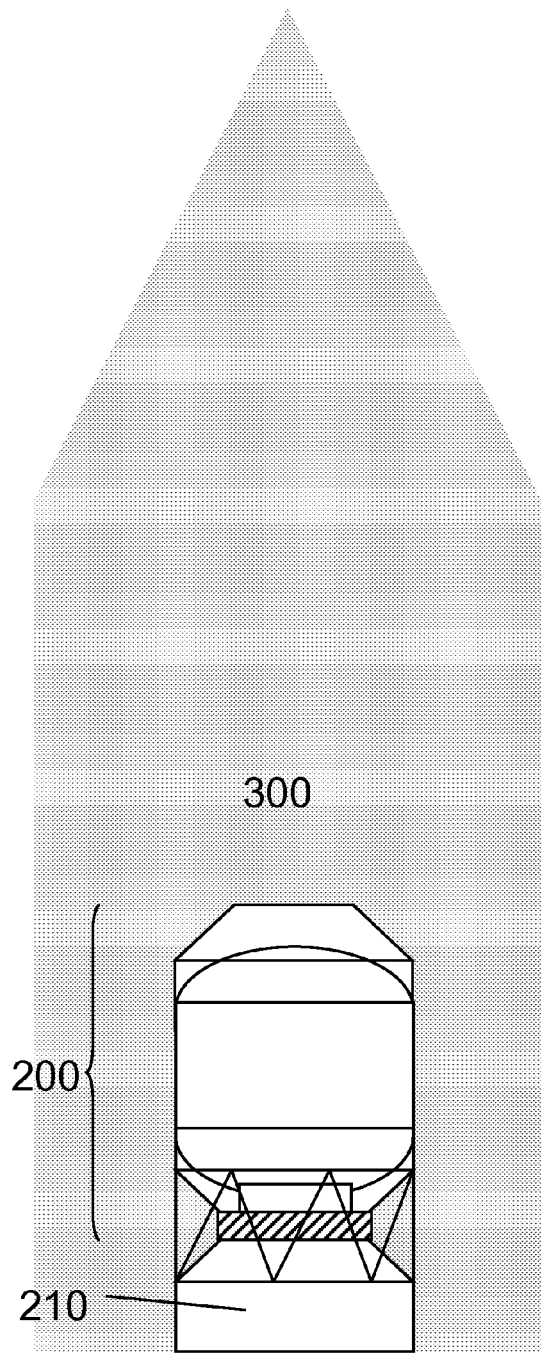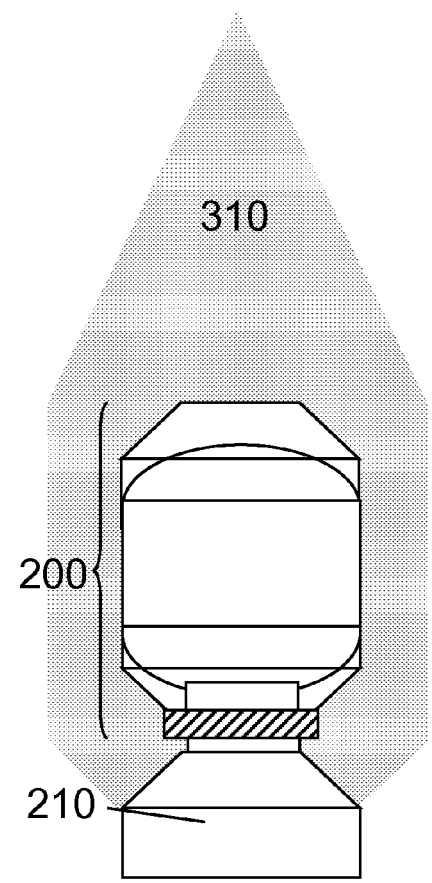
FIG. 3a                    FIG. 3b

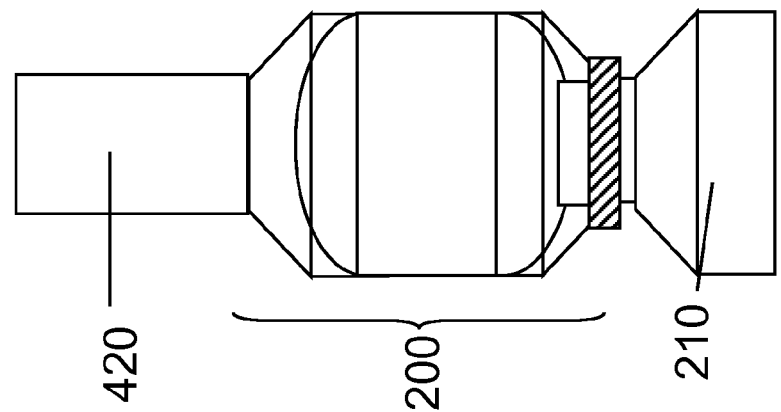
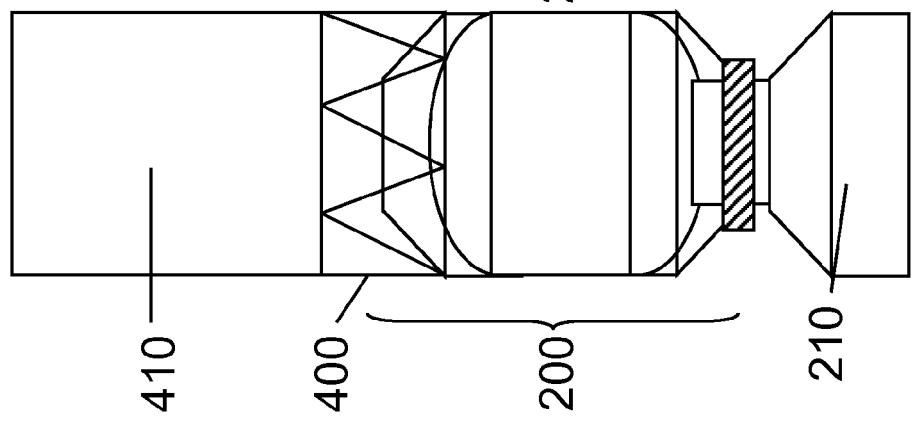
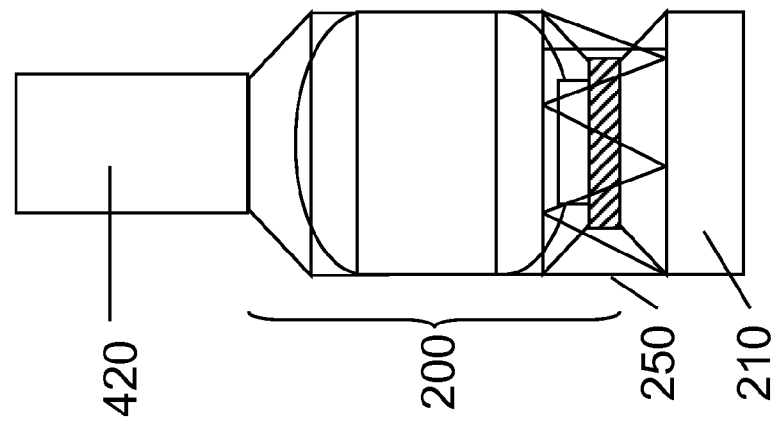
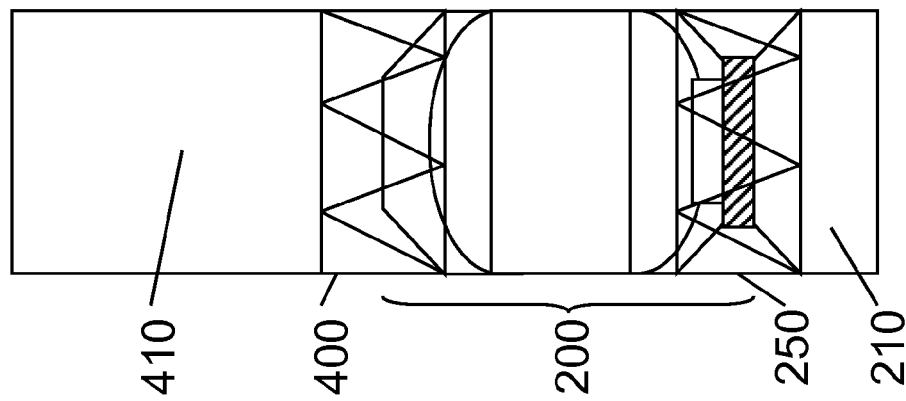

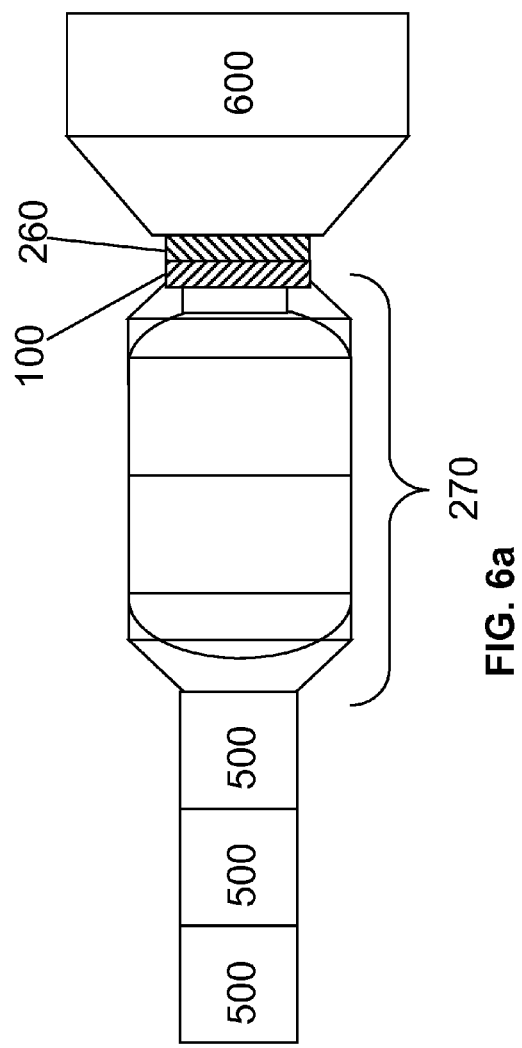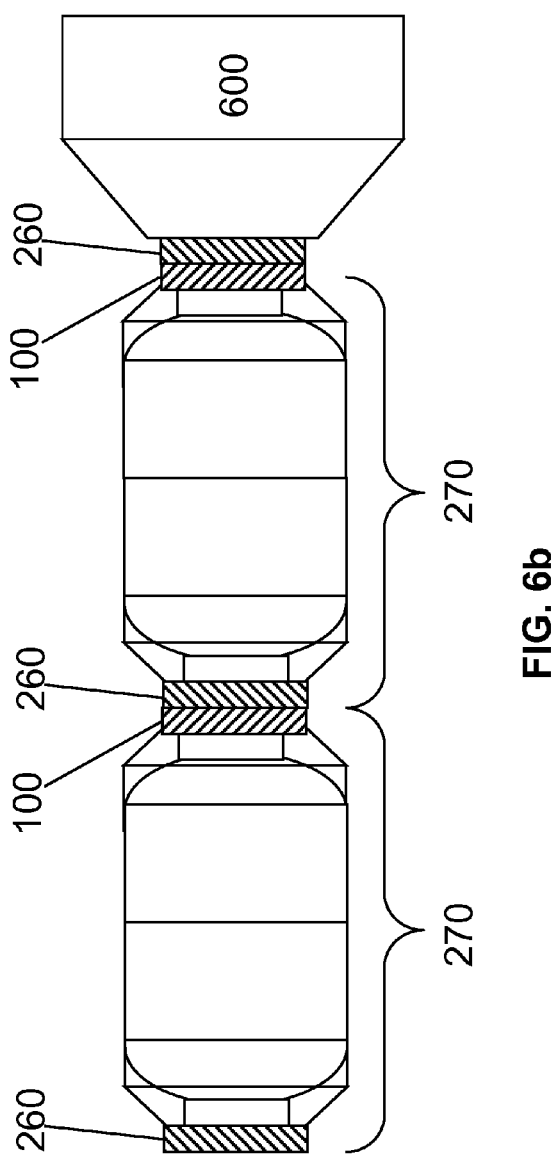

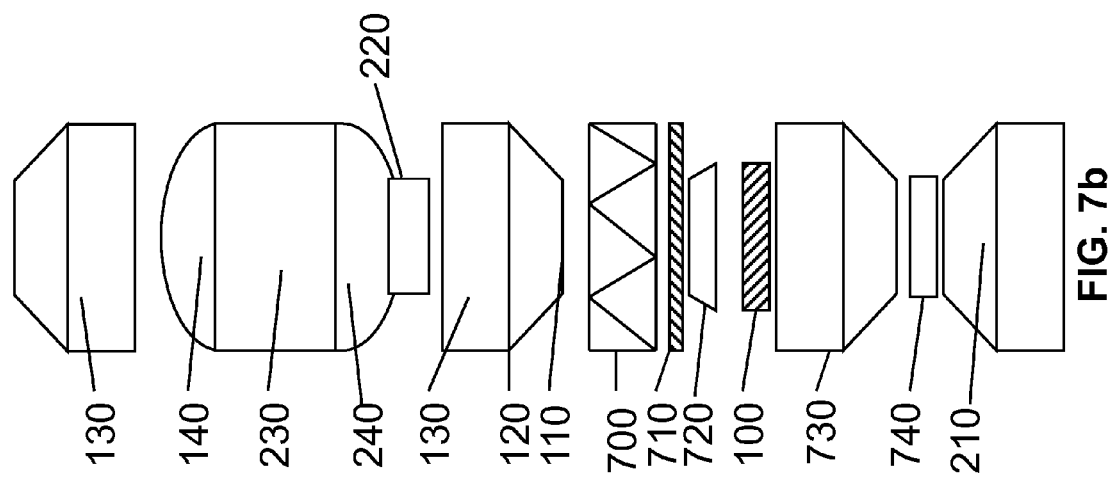
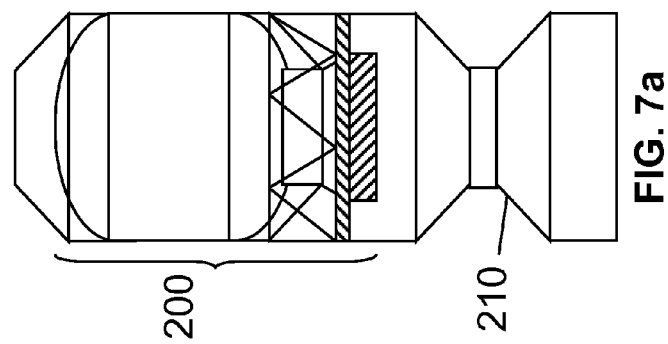

MODULAR SPACECRAFT

This application claims the benefit of provisional patent application 60/874,107 filed on Dec. 11, 2006, and is hereby incorporated by reference.

FIELD

This disclosure relates in general to the field of spacecraft, and more particularly to modular spacecraft with launch vehicle interfaces that also function as berthing or docking interfaces for the spacecraft.

DESCRIPTION OF THE RELATED ART

Typically, spacecraft launch interfaces include some form of a dual ring structure with a separation plane between the rings. Some form of releasable clamp or clamp-band is used to hold the two rings together while the launch vehicle is transporting the spacecraft to orbit. Once the boost phase is completed and thrusting has terminated; the releasable clamp or clamp-band releases, and a set of preloaded springs pushes the launch vehicle and spacecraft interface rings apart, thus releasing the spacecraft into orbit. If the spacecraft is to dock or berth with another spacecraft, a docking or berthing interface is usually provided as a separate subsystem from the launch vehicle interface. Usually one end of the spacecraft is occupied by the launch vehicle interface while the opposing end is occupied by the docking or berthing interface. This practice is wasteful and causes problems with the launch vehicle, spacecraft and target spacecraft (e.g. the International Space Station) such as the inability to carry an additional payload on the launch vehicle and the inability to dock or berth additional spacecraft to the target spacecraft once the two spacecraft are docked.

Another unmet need in the space industry is the lack of the ability to use existing spaceflight-qualified hardware in a different fashion than its original intent. An attempt at this method of spacecraft utilization was attempted in the 1960's and 1970's under the Apollo Applications Program. The Skylab space station was the successful result of this effort. Another earlier proposal included the utilization of the Atlas spent booster as a space station for project Mercury. None of these earlier attempts were modular in nature and, in fact, were point design solutions with no ability to be modified to meet the needs of diverse mission requirements.

Current boosters also have alternate utilization potential. For example, the Centaur upper stage, originally flown in the early 1960's, continues to be flown to this day. This high performance upper stage has a structural mass fraction of 0.92. In other words, only 8% of the total mass of the vehicle is devoted to structural and propulsion elements. An excellent example of the structural efficiency is the mass of the tank dome is less than 200 pounds, yet it supports a load of approximately 46 thousand pounds. The Centaur also contains a full avionics suite to operate as an autonomous spacecraft including a three-axis stabilized guidance and control system and monopropellant reaction control system. Many of these Centaur components and subsystems could be further utilized for spacecraft construction.

No spacecraft launch vehicle interface that also functions as a berthing or docking interface has ever been developed that provides the economy of utilization of one face of the spacecraft for both functions. There is currently no spacecraft design that is capable of providing a load path to carry an additional payload while providing combined launch vehicle and berthing interfaces simultaneously. Further, there is no previous system or method that employs existing spaceflight-qualified hardware to perform simultaneous launch vehicle interface, docking/berthing interface and secondary payload carrying capacity in a modular fashion that may be modified to meet the needs of diverse mission requirements.

SUMMARY

Therefore a need has arisen for a spacecraft which corrects the problems identified above.

A further need exists for a spacecraft launch vehicle interface that also functions as a berthing or docking interface.

A further need exists for a spacecraft that is capable of providing a load path to carry an additional payload while providing combined launch vehicle and berthing interfaces simultaneously.

A further need exists for a spacecraft that employs existing spaceflight-qualified hardware to perform simultaneous launch vehicle interface, docking/berthing interface and secondary payload carrying capacity in a modular fashion that may be modified to meet the needs of diverse mission requirements.

The disclosed subject matter provides an improved modular spacecraft launch vehicle interface that also functions as a berthing/docking interface and a secondary payload carrier, utilizing existing spaceflight-qualified hardware to minimize cost and schedule constraints while meeting diverse mission requirements.

Specifically, the disclosed subject matter provides a modular spacecraft. In one embodiment, the modular spacecraft includes a top forward adapter section with a top outer interface plane ring and a top inner interface plane ring; a top tank dome coupled to the top forward adapter section; at least one tank segment coupled to the top tank dome; and a bottom tank dome coupled to the tank segment(s). The bottom tank dome has an opening (e.g. a hatch), providing access to a pressurized section of the modular spacecraft. The modular spacecraft further includes a bottom forward adapter section, inverted for coupling to the bottom tank dome, comprising a bottom outer interface plane ring and a bottom inner interface plane ring, for coupling to a forward adapter section of a launch vehicle. Further, the modular spacecraft includes a bottom coupling mechanism (e.g. a berthing, docking or any other connecting mechanism), coupled to the bottom forward adapter section, located concentrically with both the bottom inner interface plane ring and the bottom outer interface plane ring.

An alternative embodiment includes an additional top coupling mechanism coupled to the top forward adapter section.

Another alternative embodiment includes a truss coupled to the bottom forward adapter section and a rear support plate coupled to the truss. The rear support plate is used as a separation system. Further, a separable forward adapter section is included for coupling to the rear support plate along with an adapter for coupling the separable forward adapter section to a forward adapter section of a launch vehicle.

Alternative embodiments include using the bottom inner interface plane ring or the bottom outer interface plane ring as a launch vehicle interface for coupling the bottom forward adapter section to the launch vehicle.

Further, alternative embodiments include an additional outer interface plane class satellite payload; standard interface plane (SIP) class satellite payload(s), or Common Cargo Carrier payload(s) coupled to the top forward adapter section. Alternative embodiments also include the use of 5-m fairing or 4-m fairing launch vehicles.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following figures and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein:

FIG. 2a is a phantom side view of an embodiment of a single pressurized segment spacecraft of the disclosed subject matter on a Centaur upper stage;

FIG. 2b is an exploded component view of an embodiment of a single pressurized segment spacecraft of the disclosed subject matter including a Centaur upper stage;

FIG. 2c is an exploded view of additional components used with an embodiment of a two pressurized segment spacecraft of the disclosed subject matter;

FIG. 2d is a phantom side view of an embodiment of a two pressurized segment spacecraft of the disclosed subject matter installed on a Centaur upper stage;

FIG. 3a is a phantom side view of an embodiment of a single pressurized segment spacecraft of the disclosed subject matter installed on a 5-m fairing Atlas V/Centaur launch vehicle;

FIG. 3b is a phantom side view of an embodiment of a single pressurized segment spacecraft of the disclosed subject matter installed on a 4-m fairing Atlas V/Centaur launch vehicle;

FIG. 4a is a phantom side view of an embodiment of a single pressurized segment spacecraft of the disclosed subject matter in combination with a 120-inch class primary satellite payload on a 5-m fairing launch vehicle;

FIG. 4b is a phantom side view of an embodiment of a single pressurized segment spacecraft of the disclosed subject matter in combination with a SIP class primary satellite payload on a 5-m fairing launch vehicle;

FIG. 4c is a phantom side view of an embodiment of a single pressurized segment spacecraft of the disclosed subject matter in combination with a 120-inch class primary satellite payload on a 4-m fairing launch vehicle;

FIG. 4d is a phantom side view of an embodiment of a single pressurized segment spacecraft of the disclosed subject matter in combination with a SIP class primary satellite payload on a 4-m fairing launch vehicle;

FIG. 6a is a phantom side view of an embodiment of a double pressurized segment spacecraft of the disclosed subject matter in combination with a triple segment CCC payload berthed to an ISS module;

FIG. 6b is a phantom side view of an embodiment of two double pressurized segment spacecraft of the disclosed subject matter berthed together and to an ISS module;

FIG. 7a is a phantom side view of an alternate embodiment of a single pressurized segment spacecraft of the disclosed subject matter on a Centaur upper stage; and FIG. 7b is an exploded component view of an alternate embodiment of a single pressurized segment spacecraft of the disclosed subject matter including a Centaur upper stage.

DETAILED DESCRIPTION OF THE SPECIFIC EMBODIMENTS

Figure 1B:
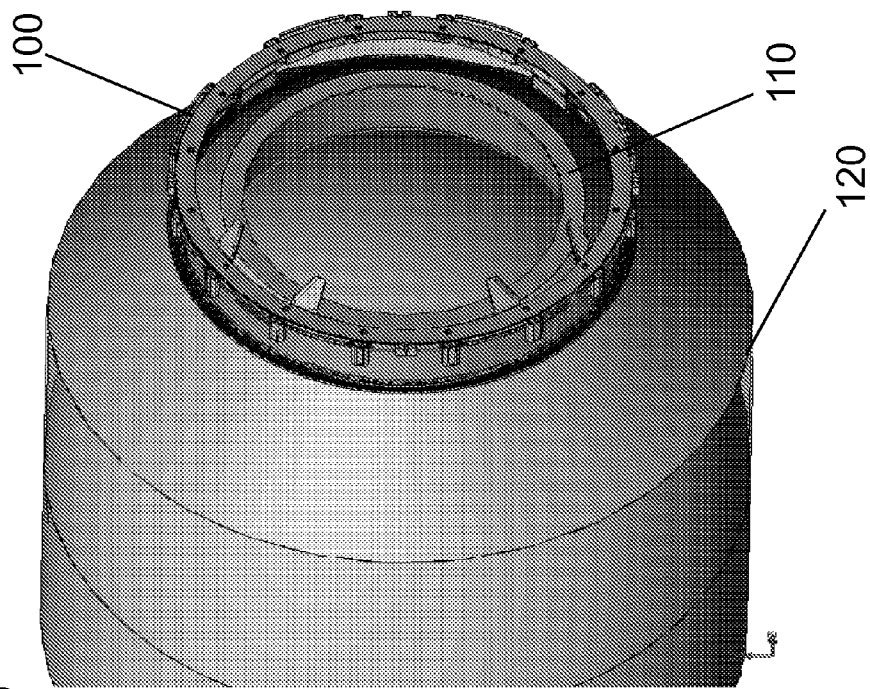
FIG. 1b is a perspective side view of an embodiment of the configuration of a PCBM with a SIP and a 120-inch interface plane.

Preferred embodiments of the present disclosure are illustrated in the drawings, like numbers being used to refer to like and corresponding parts of the various drawings.

The disclosed subject matter relates to an improved modular spacecraft with launch vehicle interface that also functions as a berthing/docking interface and a secondary payload carrier, utilizing existing spaceflight-qualified hardware in a modular fashion to minimize cost and schedule constraints while meeting diverse mission requirements. Existing spaceflight-qualified Atlas V/Centaur components are described in the embodiments below. However, a person of ordinary skill in the art would understand that alternative existing spaceflight-qualified hardware may also be used.

Further, the disclosed subject matter uses outer interface plane rings and inner interface plane rings. A standard interface plane (SIP) ring is used for the inner interface plane rings in the embodiments described below. Similarly, a 120-inch ring is used for the outer interface plane rings in the embodiments described below. However, a person of ordinary skill in the art would understand that alternative outer interface plane rings and inner interface plane rings may also be used.

In addition, the disclosed subject matter uses coupling mechanisms. In the embodiments described below, the coupling mechanisms may be a passive common berthing mechanism (PCBM) or an active common berthing mechanism (ACBM). However, a person of ordinary skill in the art would understand that a berthing, docking or any other connecting mechanism may be used as the coupling mechanism.

In one embodiment, the disclosed subject matter utilizes existing spaceflight-qualified Centaur Forward Adapter Section as well as propellant tank components, avionics and propulsion systems in combination with a Passive Common Berthing Mechanism (PCBM). These components create a spacecraft that may be mounted under a 4-meter diameter fairing utilizing a Standard Interface Plane (SIP) ring as a launch vehicle interface or under a 5-meter fairing utilizing either a SIP or an outer 120-inch interface. A PCBM is located concentrically with both of the launch vehicle interface rings. A SIP interface ring is located within the diameter of the PCBM and a 120-inch interface ring is located outside the diameter of the PCBM. The PCBM as well as the SIP and 120-inch interface rings are located on the aft end of the spacecraft. The forward end of the spacecraft may include a similar structure where an Active Common Berthing Mechanism (ACBM) is concentrically located with a SIP and 120-inch interface ring set. Thus, on the launch vehicle, an additional payload may be accommodated forward of the spacecraft utilizing existing SIP or 120-inch interfaces. The placement of the PCBM and ACBM is not critical and any other docking/berthing mechanisms may be employed. In an alternative embodiment, androgynous docking interfaces could be employed on both ends; in a still further embodiment, PCBMs or Active Common Berthing Mechanisms (ACBMs) could occupy both sides, or the PCBM and ACBM could be interchanged.

Figure 1A:
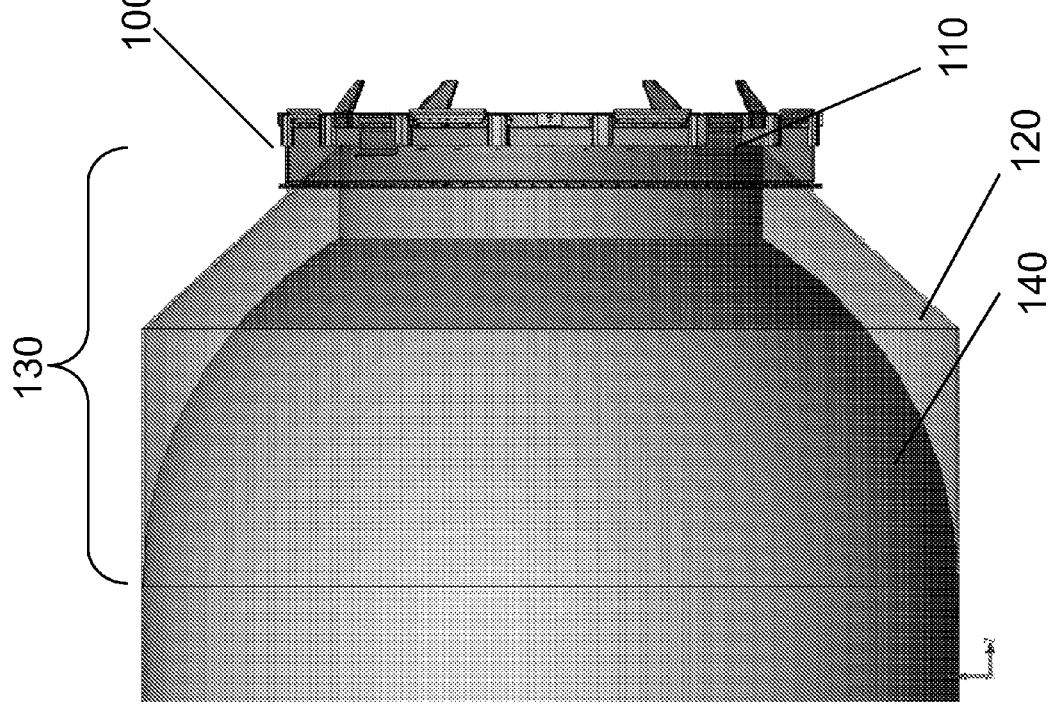
FIG. 1a is a phantom side view an embodiment of the configuration of a Passive Common Berthing Mechanism (PCBM) with a Standard Interface Plane (SIP) and a 120-inch interface plane.

FIG. 1a is a phantom side view of an embodiment of the configuration of coupling mechanism PCBM 100 with inner interface plane ring (SIP ring) 110 and outer interface plane ring (120-inch interface plane ring) 120; while FIG. 1b is a perspective side view. PCBM 100 is attached to the launch vehicle forward adapter section (Centaur Forward Adapter) 130 by a suitable flange, among other alternatives. SIP 110 and 120-inch interface plane 120 are part of the off-the-shelf Centaur Forward Adapter 130 and are unaltered. A top tank dome (Centaur Tank Dome) 140 may be connected to Centaur Forward Adapter 130 in conventional fashion.

FIG. 2a is a phantom side view of an embodiment of a single pressurized segment spacecraft assembly 200 of the disclosed subject matter installed on a Centaur upper stage 210.

FIG. 2b is an exploded component view of an embodiment of a single pressurized segment spacecraft of the disclosed subject matter including a Centaur upper stage 210. A top forward adapter section (Centaur Forward Adapter) 130 is attached to Centaur Tank Dome 140. Centaur Tank Dome 140 is attached to a tank segment (in the embodiment shown, a 36-inch long Centaur Tank Segment) 230 which is further attached to a bottom tank dome (Centaur Tank Dome) 240. An inverted Centaur Forward Adapter (bottom forward adapter section) 130 forms the rear attach portion of the spacecraft. PCBM 100 is concentrically located to SIP 110 and 120-inch interface plane 120. Tunnel opening (i.e. hatch) 220 connects PCBM 100 to Centaur Tank Dome 240. The entire spacecraft is mounted to a launch vehicle forward adapter section 210 (in the embodiment shown, this is identical in construction to Centaur Forward Adapter 130) via the SIP 110. SIP 110 and 120-inch interface plane 120 utilize conventional spacecraft separation systems such as clamp bands, pyrotechnic bolts, etc. as is well known in the art and available off the shelf. An additional adapter (e.g. a C-13, C-22, etc.) 280 may be placed between the two SIP planes 110 of the Centaur forward adapter 210 and the aft facing Centaur forward adapter 130 to facilitate ground handling and launch vehicle interface.

FIG. 2c is an exploded view of additional components used with an embodiment of a two pressurized segment spacecraft of the disclosed subject matter. ACBM 260, forward tunnel 220, Centaur Tank Dome 140, two 36-inch long Centaur Tank Segments 230, Centaur Tank Dome 240 and a 120-inch payload attach fitting are used to form the spacecraft depicted in FIG. 2d. In this embodiment, no structural interface (e.g. C adapter 280) is required between the two SIP planes 110 of the Centaur forward adapter 210 and the aft facing Centaur forward adapter 130 since all structural loads may be taken by the exterior truss 250.

FIG. 2d is a phantom side view of an embodiment of a two pressurized segment spacecraft 270 according of the disclosed subject matter installed on a Centaur upper stage 210.

FIG. 3a is a phantom side view of an embodiment of a single pressurized segment spacecraft 200 of the disclosed subject matter installed on a 5-m fairing 300 Atlas V/Centaur launch vehicle. The launch vehicle Centaur Forward Adapter 210 is essentially emulated on the front of the spacecraft 200 using the methods of construction described earlier. Utilization of a 120-inch payload attach fitting truss enhances the stiffness of the structure in the case of the 5-meter fairing 300.

FIG. 3b is a phantom side view of a single pressurized segment spacecraft 200 of the disclosed subject matter installed on a 4-m fairing 310 Atlas V/Centaur launch vehicle. The launch vehicle Centaur Forward Adapter 210 is essentially emulated on the front of the spacecraft 200 using the methods of construction described earlier. A SIP is used in the case of the 4-meter fairing 310, as the boat tail of fairing 310 interfaces with the 120-inch payload attach fitting.

FIG. 4a is a phantom side view of an embodiment of a single pressurized segment spacecraft 200 of the disclosed subject matter in combination with a 120-inch class primary satellite payload 410 on a 5-m fairing launch vehicle. This illustration shows how the spacecraft 200 emulates the forward launch vehicle attach system 210 forward of spacecraft 200. Two 120-inch payload attach fittings 250 and 400 are utilized to maximize stiffness of the assembly.

FIG. 4b is a phantom side view of an embodiment of a single pressurized segment spacecraft 200 of the disclosed subject matter in combination with a SIP class primary satellite payload 420 on a 5-m fairing launch vehicle. This illustration shows how the spacecraft 200 emulates the forward launch vehicle attach system 210 forward of spacecraft 200. One 120-inch payload attach fitting 250 is utilized to maximize stiffness of the assembly. SIP class primary satellite payload 420 is attached to the SIP forward of spacecraft 200.

FIG. 4c is a phantom side view of an embodiment of a single pressurized segment spacecraft 200 of the disclosed subject matter in combination with a 120-inch class primary satellite payload 410 on a 4-m fairing launch vehicle. This illustration shows how the spacecraft 200 emulates the forward launch vehicle attach system 210 forward of spacecraft 200. One 120-inch payload attach fitting 400 is used to attach to the 120-inch class primary satellite payload 410 to maximize stiffness of the assembly. Spacecraft 200 is attached to the launch vehicle 210 via SIP.

FIG. 4d is a phantom side view of an embodiment of a single pressurized segment spacecraft 200 of the disclosed subject matter in combination with a SIP class primary satellite payload 420 on a 4-m fairing launch vehicle. This illustration shows how the spacecraft 200 emulates the forward launch vehicle attach system 210 forward of spacecraft 200. SIP is used to attach to the SIP class primary satellite payload 420 to spacecraft 200. Spacecraft 200 is attached to the launch vehicle 210 via SIP.

Figure 5C:
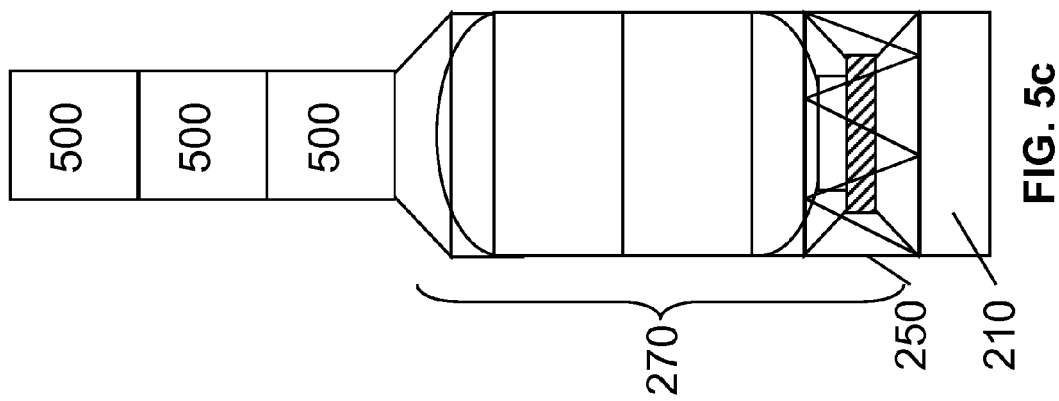
FIG. 5c is a phantom side view of an embodiment of a double pressurized segment spacecraft of the disclosed subject matter in combination with a triple segment CCC payload on a 5-m fairing launch vehicle.
Figure 5B:
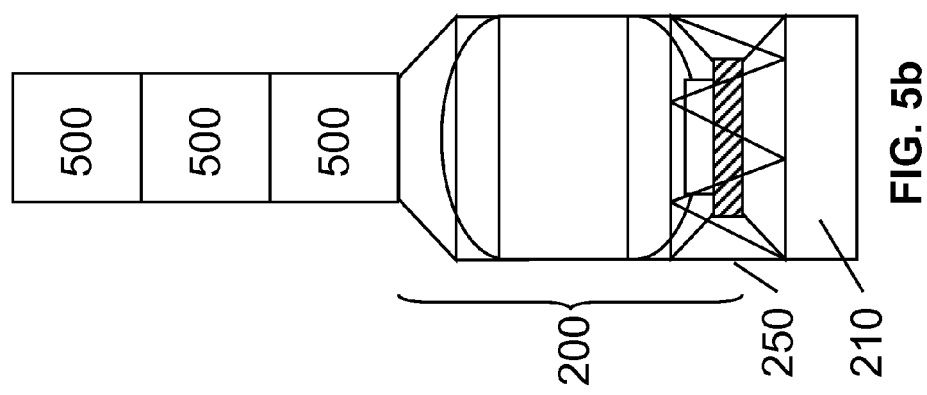
FIG. 5b is a phantom side view of an embodiment of a single pressurized segment spacecraft of the disclosed subject matter in combination with a triple segment CCC payload on a 5-m fairing launch vehicle.
Figure 5A:
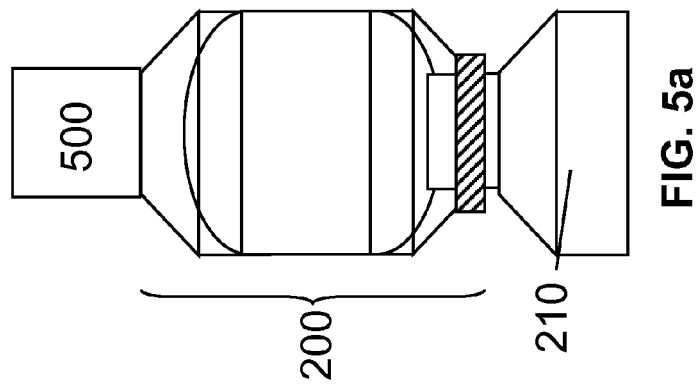
FIG. 5a is a phantom side view of an embodiment of a single pressurized segment spacecraft of the disclosed subject matter in combination with a single segment Common Cargo Carrier (CCC) payload on a 4-m fairing launch vehicle.

FIG. 5a is a phantom side view of an embodiment of a single pressurized segment spacecraft 200 of the disclosed subject matter in combination with a single segment Common Cargo Carrier (CCC) payload 500 on a 4-m fairing launch vehicle. The CCC 500 is a modular system designed to carry ISS external Orbital Replacement Units (ORUs) for installation on the outside of the ISS. The CCC 500 may also carry any other payload that may be desired. Spacecraft 200 is attached to the launch vehicle 210 via SIP.

FIG. 5b is a phantom side view of an embodiment of a single pressurized segment spacecraft 200 of the disclosed subject matter in combination with a triple segment CCC payload 500 on a 5-m fairing launch vehicle. Spacecraft 200 attaches to the launch vehicle 210 via 120-inch payload attach fitting 250.

FIG. 5c is a phantom side view of an embodiment of a double pressurized segment spacecraft 270 of the disclosed subject matter in combination with a triple segment CCC payload 500 on a 5-m fairing launch vehicle. Spacecraft 270 attaches to the launch vehicle 210 via 120-inch payload attach fitting 250.

FIG. 6a is a phantom side view of an embodiment of a double pressurized segment spacecraft 270 of the disclosed subject matter in combination with a triple segment CCC payload 500 berthed to an ISS module 600. PCBM 100 attaches to ACBM 260 and holds spacecraft 270 in position as well as providing crew access to the pressurized section of spacecraft 270.

FIG. 6b is a phantom side view of an embodiment of two double pressurized segment spacecraft 270 of the disclosed subject matter berthed together and to an ISS module 600. PCBM 100 attaches to ACBM 260 and holds both spacecraft 270 in position and provides crew access to the pressurized section of both spacecraft 270 from ISS module 600.

FIG. 7a is a phantom side view of an embodiment of a single pressurized segment spacecraft assembly 200 of the disclosed subject matter installed on a Centaur upper stage 210. This configuration utilizes attachment at the 120-inch interface plane while the spacecraft assembly 200 is contained under a 4-m fairing.

FIG. 7b is an exploded component view of an embodiment of a single pressurized segment spacecraft of the disclosed subject matter including a Centaur upper stage 210. Centaur Forward Adapter 130 is attached to Centaur Tank Dome 140. Centaur Tank Dome 140 is attached to a 36-inch Centaur Tank Segment 230 which is further attached to a Centaur Tank Dome 240. An inverted Centaur Forward Adapter 130 forms the rear attach portion of the spacecraft. PCBM 100 is concentrically located to SIP 110 and 120-inch interface plane 120. Tunnel 220 connects SIP 110 to Centaur Tank Dome 240. PCBM 100 is attached to adapter 720 which is attached to SIP 110. Truss 700 is attached to rear support plate 710. Rear support plate 710 interfaces via a separation system (e.g. pyrotechnic bolts) with an aft facing Centaur forward adapter 730. The entire spacecraft is mounted to a launch vehicle forward adapter section 210 (in the embodiment shown, this is identical in construction to Centaur Forward Adapter 130) via the adapter 740 (e.g. a C-13, C-22, etc. adapter ring). The 120-inch interface plane at rear support plate 710 utilizes conventional spacecraft separation systems such as pyrotechnic bolts, etc. as is well known in the art and available off the shelf.

In operation of the spacecraft of the disclosed subject matter, mission requirements are first analyzed to determine the proper configuration of spacecraft required for a specific mission. The modular nature of the spacecraft permits mission specific customization. For example, if a large amount of pressurized cargo is required, two 36-in. Centaur Tank segments 230 may be utilized to carry additional pressurized payload. Other mission requirements may result in the utilization of alternative configurations of spacecraft.

Another advantage in the operation of the spacecraft of the disclosed subject matter is the ability to lower launch costs by maximizing the utilization of the launch vehicle capability. For example, a particular satellite may require the use of an Atlas V 401 launch vehicle. If this launch could be combined with a version of the spacecraft of the disclosed subject matter and launched on a larger launch vehicle (for example, an Atlas V 521), the launch cost of the satellite may be reduced by a factor of 30% while simultaneously reducing the launch costs of the spacecraft of the disclosed subject matter.

Yet another advantage of the operation of the spacecraft of the disclosed subject matter is lower costs resulting from a reduction of the amount of engineering and analysis required by utilizing flight proven hardware. Non-recurring engineering effort is minimized by using the proven Centaur components. This also has the advantage of using the existing assembly line for the Centaur stage to manufacture spacecraft components without the added capital expense of a new assembly line (e.g. welders, jigs, tooling, etc.).

Yet another advantage of the operation of the spacecraft of the disclosed subject matter is the flexibility of launch vehicle utilization provided by the two launch vehicle interfaces. As with the spacecraft, the launch vehicle may be tailored to the specific mission to maximize performance and minimize cost.

A further advantage of the operation of the spacecraft of the disclosed subject matter is that the modules may be attached to existing space stations and used to increase the overall volume and living space of orbiting laboratories at relatively low cost.

The foregoing description of the preferred embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A modular spacecraft, comprising:
   a top forward adapter section, said top forward adapter section comprising a top outer interface plane ring and a top inner interface plane ring;
   a top tank dome coupled to said top forward adapter section;
   at least one tank segment coupled to said top tank dome;
   a bottom tank dome coupled to said at least one tank segment, said bottom tank dome having an opening, said opening providing access to a pressurized section of the modular spacecraft;
   a bottom forward adapter section, said bottom forward adapter section inverted for coupling to said bottom tank dome, said bottom forward adapter section comprising a bottom outer interface plane ring and a bottom inner interface plane ring, said bottom forward adapter section for coupling to a forward adapter section of a launch vehicle; and
   a bottom coupling mechanism coupled to said bottom forward adapter section, said coupling mechanism located concentrically with both said bottom inner interface plane ring and said bottom outer interface plane ring.

2. The modular spacecraft of claim 1, wherein said bottom inner interface plane ring is used as a launch vehicle interface for coupling said bottom forward adapter section to said launch vehicle.

3. The modular spacecraft of claim 1, wherein said bottom outer interface plane ring is used as a launch vehicle interface for coupling said bottom forward adapter section to said launch vehicle.

4. The modular spacecraft of claim 1, further comprising an outer interface plane class satellite payload coupled to said top outer interface plane ring.

5. The modular spacecraft of claim 1, further comprising an inner interface plane class satellite payload coupled to said top inner interface plane ring.

6. The modular spacecraft of claim 1, further comprising at least one Common Cargo Carrier payload coupled to said top forward adapter section.

7. The modular spacecraft of claim 1, wherein said bottom coupling mechanism coupled to said bottom forward adapter section comprises a passive common berthing mechanism.

8. The modular spacecraft of claim 1, wherein said bottom forward adapter section for coupling to a forward adapter section of a launch vehicle comprises a bottom forward adapter section for coupling to a forward adapter section of a 5-m fairing launch vehicle.

9. The modular spacecraft of claim 1, wherein said bottom forward adapter section for coupling to a forward adapter section of a launch vehicle comprises a bottom forward adapter section for coupling to a forward adapter section of a 4-m fairing launch vehicle.

10. A modular spacecraft, comprising:
- a top forward adapter section, said top forward adapter section comprising a top outer interface plane ring and a top inner interface plane ring;
- a top coupling mechanism coupled to said top forward adapter section, said top coupling mechanism located concentrically with both said top inner interface plane ring and said top outer interface plane ring;
- a top tank dome coupled to said top forward adapter section, said top tank dome having an opening, said opening providing access to a pressurized section of the modular spacecraft;
- at least one tank segment coupled to said top tank dome;
- a bottom tank dome coupled to said at least one tank segment, said bottom tank dome having an opening, said opening providing access to said pressurized section of the modular spacecraft;
- a bottom forward adapter section, said bottom forward adapter section inverted for coupling to said bottom tank dome, said bottom forward adapter section comprising a bottom outer interface plane ring and a bottom inner interface plane ring, said bottom forward adapter section for coupling to a forward adapter section of a launch vehicle; and
- a bottom coupling mechanism coupled to said bottom forward adapter section, said bottom coupling mechanism located concentrically with both said bottom inner interface plane ring and said bottom outer interface plane ring.

11. The modular spacecraft of claim 10, wherein said bottom inner interface plane ring is used as a launch vehicle interface for coupling said bottom forward adapter section to said launch vehicle.

12. The modular spacecraft of claim 10, wherein said bottom outer interface plane ring is used as a launch vehicle interface for coupling said bottom forward adapter section to said launch vehicle.

13. The modular spacecraft of claim 10, further comprising an outer interface plane class satellite payload coupled to said top outer interface plane ring.

14. The modular spacecraft of claim 10, further comprising an inner interface plane class satellite payload coupled to said top inner interface plane ring.

15. The modular spacecraft of claim 10, further comprising at least one Common Cargo Carrier payload coupled to said top forward adapter section.

16. The modular spacecraft of claim 10, wherein said bottom coupling mechanism coupled to said bottom forward adapter section comprises a passive common berthing mechanism.

17. The modular spacecraft of claim 10, wherein said top coupling mechanism coupled to said top forward adapter section comprises an active common berthing mechanism.

18. The modular spacecraft of claim 10, wherein said bottom forward adapter section for coupling to said forward adapter section of a launch vehicle comprises a bottom forward adapter section for coupling to a forward adapter section of a 5-m fairing launch vehicle.

19. The modular spacecraft of claim 10, wherein said bottom forward adapter section for coupling to said forward adapter section of a launch vehicle comprises a bottom forward adapter section for coupling to a forward adapter section of a 4-m fairing launch vehicle.

20. A modular spacecraft, comprising:
- a top forward adapter section, said top forward adapter section comprising a top outer interface plane ring and a top inner interface plane ring;
- a top tank dome coupled to said top forward adapter section;
- at least one tank segment coupled to said top tank dome;
- a bottom tank dome coupled to said at least one tank segment, said bottom tank dome having an opening, said opening providing access to a pressurized section of the modular spacecraft;
- a bottom forward adapter section, said bottom forward adapter section inverted for coupling to said bottom tank dome, said bottom forward adapter section comprising a bottom outer interface plane ring and a bottom inner interface plane ring;
- a bottom coupling mechanism coupled to said bottom forward adapter section, said bottom coupling mechanism located concentrically with both said bottom inner interface plane ring and said bottom outer interface plane ring,
- a truss coupled to said bottom forward adapter section;
- a rear support plate coupled to said truss, said rear support plate used as a separation system;
- a separable forward adapter section, said separable forward adapter section inverted for coupling to said rear support plate; and
- an adapter for coupling said separable forward adapter section to a forward adapter section of a launch vehicle.

21. The modular spacecraft of claim 20, further comprising:
- a top coupling mechanism coupled to said top forward adapter section, said top coupling mechanism located concentrically with both said top inner interface plane ring and said top outer interface plane ring; and
- wherein said top tank dome has an opening, said opening providing access to said pressurized section of the modular spacecraft.

* * * * *